United States Patent
Bidichandani et al.

(10) Patent No.: US 8,626,102 B1
(45) Date of Patent: Jan. 7, 2014

(54) RADIO COEXISTENCE USING CLOCK RATE ADAPTATION

(75) Inventors: Sameer Bidichandani, Los Gatos, CA (US); Ashley Teiko Uyehara, Sunnyvale, CA (US); Srinivasa H. Garlapati, San Ramon, CA (US); Ken Yeung, Cupertino, CA (US)

(73) Assignee: Marvell International Ltd. (BM)

( * ) Notice: Subject to any disclaimer, the term of this patent is extended or adjusted under 35 U.S.C. 154(b) by 141 days.

(21) Appl. No.: 13/197,019

(22) Filed: Aug. 3, 2011

Related U.S. Application Data

(60) Provisional application No. 61/371,522, filed on Aug. 6, 2010.

(51) Int. Cl.
*H04B 1/10* (2006.01)

(52) U.S. Cl.
USPC ........ 455/296; 455/208; 455/209; 455/182.2; 455/164.2; 455/192.2

(58) Field of Classification Search
USPC ......... 455/296, 208, 209, 182.2, 164.2, 192.2
See application file for complete search history.

(56) References Cited

U.S. PATENT DOCUMENTS

| | | | |
|---|---|---|---|
| 6,192,089 B1 * | 2/2001 | Corleto et al. | 375/344 |
| 2003/0058973 A1 * | 3/2003 | Tsecouras | 375/344 |

* cited by examiner

*Primary Examiner* — Sanh Phu

(57) ABSTRACT

Systems, methods, and other embodiments associated with radio coexistence using clock rate adaptation are described. According to one embodiment, a device includes a system bus configured to transmit and receive data at a clock rate. The device also includes a radio logic configured to receive radio frequency signals. The device further includes a clock logic configured to adjust the clock rate of the system bus when the radio logic is receiving the radio frequency signals.

19 Claims, 3 Drawing Sheets

RADIO COEXISTENCE USING CLOCK RATE ADAPTATION

CROSS-REFERENCE TO RELATED APPLICATIONS

This application claims the benefit of U.S. Provisional Application Ser. No. 61/371,522 filed on Aug. 6, 2010, which is hereby incorporated by reference.

BACKGROUND

Frequency Modulation (FM) radio is a type of radio that receives information from a carrier wave that has a varying frequency. Electromagnetic interference (EMI) from nearby electronic devices can interrupt, obstruct, or otherwise degrade or limit the ability of an FM radio to receive information from these carrier waves. Integrated components in the FM radio are one source of EMI that can result in degraded performance. For example, highly integrated devices that include radios and other components can have several sources of EMI that can interfere with how the radio operates.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

In one embodiment, a device includes a host interface and a clock logic. The host interface exchanges data between the device and a host at a clock rate. The clock logic is configured to change the clock rate of the host interface. The clock logic changes the clock rate when an FM radio is in use to reduce interference with the FM radio.

In another embodiment, a method includes detecting a frequency modulation (FM) radio is operating at a selected frequency. The method also includes adjusting a clock rate of a bus to a different clock rate. The method adjusts the clock rate in response to determining that the clock rate conflicts with the selected frequency of the FM radio.

In a further embodiment, a device includes a system bus configured to transmit and receive data at a clock rate. The device also includes a radio logic configured to receive radio frequency signals. The device further includes a clock logic configured to adjust the clock rate of the system bus when the radio logic is receiving the radio frequency signals.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example devices, systems, methods and other embodiments associated with reducing or eliminating interference with a radio from a system bus in an integrated device. In one embodiment, logic monitors an FM radio to determine when the FM radio is in use and based on the use, adjusts a clock rate of the system bus to facilitate reducing interference with the FM radio from the system bus.

Figure 1:
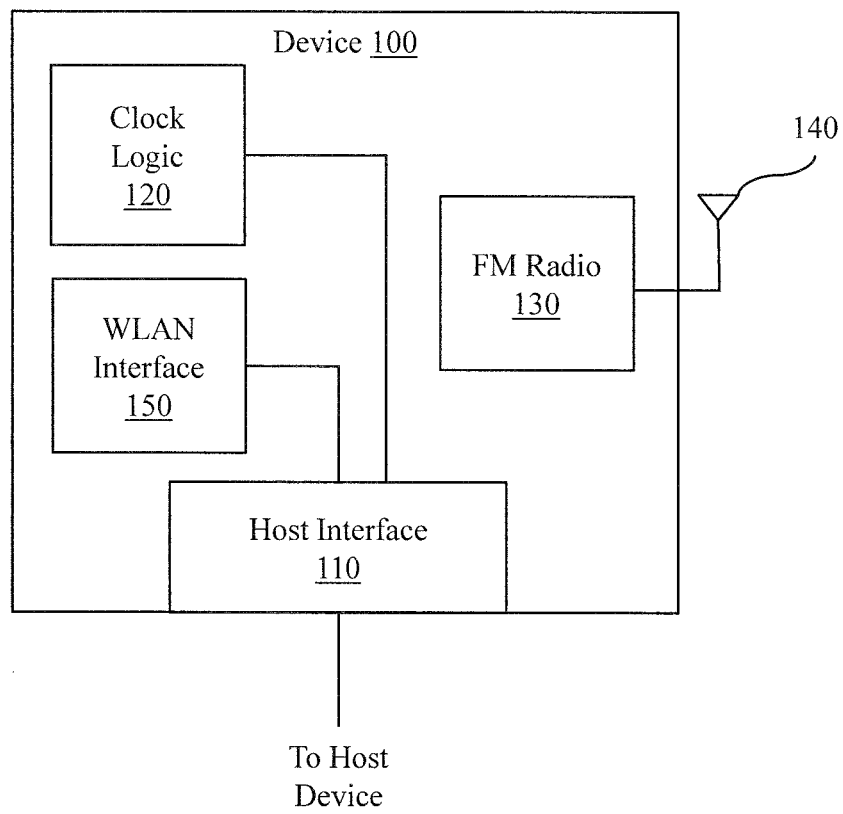
FIG. 1 illustrates one embodiment of a device associated with clock rate adaptation to reduce interference with a radio.

With reference to FIG. 1, one embodiment of a device 100 is shown that is associated with reducing or eliminating interference produced by a bus in a device that includes a radio. Device 100 includes, for example, host interface 110, clock logic 120, FM radio 130, antenna 140, and Wireless Local Area Network (WLAN) interface 150. Antenna 140 is, for example, an external antenna, an internal integrated antenna, and so on. Other types of network interfaces may also be used instead of or in combination with the WLAN interface 150. In one embodiment, the device 100 is implemented on a chip including one or more integrated circuits configured to perform one or more of the functions described herein.

In one embodiment, host interface 110 is a computer bus that connects components in the device 100 to a host. Device 100 uses the host interface 110 to exchange data with the host. In one embodiment, the device 100 is a component/chip integrated within or connected to the host. The host is, for example, a cellular handset, a smartphone, a portable audio/video device, a navigation device, a Personal Digital Assistant (PDA), a gaming device, a computer and so on. Thus, in one example, host interface 110 transmits data to the host that is received on a Wireless Local Area Network (WLAN) interface 150 in device 100.

The host interface 110 is configured to transmit and receive data at a frequency that is determined by a clock rate. The clock rate is adjustable/programmable and can be set to a pre-determined value such as 100 MHz. Thus, if the host interface is 4 bits wide it will transmit/receive 400 Mbits/sec when using a clock rate of 100 MHz. When operating at a specified clock rate, the host interface 110 produces electromagnetic interference (EMI) with the same frequency as the clock rate. Thus, when the clock rate is 100 MHz, host interface 110 produces an EMI signal with a frequency of 100 MHz.

The host interface 110 is, for example, a Secure Digital Input Output (SDIO) interface, a Serial Peripheral Interface (SPI) bus, and so on. The host interface 110 can be a single interface or a group of interfaces. For instance, host interface 110 can include both an SDIO interface and an SPI bus. Device 100 can be integrated with the host or may be removeably coupled to the host via host interface 110 (e.g., connection port). In one embodiment, instead of having the host interface 110, the device 100 includes a system bus. The system bus is an integrated bus that connects components internally. Thus, in an example where device 100 is a standalone device, the system bus is configured to exchange data between the components in the device 100. In an embodiment where the device 100 is a stand-alone computing device, the device 100 can include at least a processor connected to the system bus. In this case, clock logic 120 is configured to adjust the clock rate of the system bus as discussed below.

With continued reference to FIG. 1, the clock logic 120 is configured to change the clock rate of the host interface 110. In one embodiment, clock logic 120 changes the clock rate by reducing the clock rate to a lower frequency or increasing the clock rate to a higher frequency. Clock logic 120 is configured to change the clock rate to reduce interference with the FM radio 130 when the FM radio 130 is in use. When the clock rate is within a predetermined range of the frequency that the FM radio 130 is tuned to receive, interference with signals received by the FM radio 130 can occur. This may result in an undesirable effect in the signals or even causing the signals to be blocked. Thus the clock logic 120 is configured to detect when the FM radio 130 is in use, and then determine if and how to change the clock rate to reduce or avoid the interference.

In one embodiment, the clock logic 120 determines when the FM radio 130 is in use before attempting to change the clock rate. Since no interference occurs when the FM radio 130 is not in use there is no need to change the clock rate unless FM radio 130 is on. In one embodiment, the clock logic 120 determines when FM radio 130 is in use by detecting when the antenna 140 is receiving radio frequency signals. In alternative embodiments, clock logic 120 determines that the FM radio 130 is in use by, for example, receiving an interrupt signal that indicates that the radio is operating, checking a register that is set to indicate the operating status of the FM radio 130, and so on.

In one embodiment, when clock logic 120 determines that FM radio 130 is in use, clock logic 120 automatically changes the clock rate to a modified clock rate that will not interfere with FM radio 130. For example, the clock logic 120 determines the current frequency band that the FM radio 130 is set at. The frequency band can be determined, for example, from parameters or settings from the FM radio 130. Then the clock rate is changed to a rate that is outside of the current frequency band.

Consider one example where the FM radio 130 is operating and receives signals in a frequency range of 76 MHz to 108 MHZ. Thus, clock logic 120 may reduce the clock rate to be below the frequency range, for example, to 60 MHz to avoid interfering with the FM radio signals. Alternatively, clock logic 120 may increase the clock rate above the frequency range, for example, to 120 MHz to avoid the range of 76 MHz to 108 MHz.

Some additional effects of changing the clock rate can occur. For example, decreasing the clock rate may cause the device 100 to consume less power. Increasing the clock rate may increase the available bandwidth of the host interface 110. Accordingly when FM radio 130 is in use, clock logic 120 may be configured to change the clock rate based on additional conditions, e.g., increase the clock rate if more bandwidth is desirable or decrease the clock rate if power savings is desirable. The decision to increase or decrease the clock rate may be dependent on a system setting, a user input, and so on.

In an alternative embodiment, instead of changing the clock rate to a value that is out-of-band, clock logic 120 adjusts the clock rate by a predetermined amount to avoid interfering with a selected frequency of the FM radio 130. For example, clock logic 120 determines the current frequency being used by the FM radio 130 (e.g., frequency selected by a user) and changes the clock rate depending on the selected frequency. For example, when a frequency being used by FM radio 130 is within a predetermined range of the current clock rate, clock logic 120 adjusts the clock rate by the predetermined amount to avoid the radio frequency. In this way, clock logic 120 changes the clock rate to a lesser degree while still avoiding interference with the FM radio 130.

The predetermined amount is, in one embodiment, a predetermined frequency difference from the current radio frequency that reduces or avoids interference with FM radio 130 when the clock rate is adjusted by the predetermined amount. In one embodiment, the predetermined amount is 2 MHz. Thus, the clock logic 120, upon determining that the clock rate interferes with the radio frequency, adjusts the clock rate by 2 MHz.

Clock logic 120 also dynamically adjusts the clock rate as the radio frequency changes. For example, the clock logic 120 dynamically adjusts the clock rate when the FM radio 130 is in use and as the current radio frequency changes from an initial frequency to a second frequency. This situation may occur when a user changes the channel of the FM radio.

Other than the clock rate itself interfering with FM radio 130, harmonic multiples of the clock rate can cause interference. Harmonic multiples are signals with a frequency that is an integer multiple of a base signal frequency. In one embodiment, the clock logic 120 is configured to avoid setting the clock rate at a frequency that produces a harmonic that will interfere with the current radio frequency. Accordingly, if the fundamental frequency is f, the harmonics have frequencies 2f, 3f, 4f, . . . etc. For example, if the radio is tuned to a channel using a selected frequency of 100 MHz, the clock logic 120 will not change the clock rate to 50 MHz because 100 MHz is a harmonic of 50 MHz (i.e. 2f=2×50 Mhz=100 Mhz). Thus, the clock logic 120 selects a modified clock rate that does not have a harmonic that interferes with the current radio frequency. In this example, since using a clock rate of 50 MHz would still interfere with the radio frequency of 100 Mhz, the clock logic 120 instead changes the clock rate to a frequency that does not have a harmonic multiple (e.g., 160 MHz or 65 Mhz) that would interfere with the radio frequency of the FM radio 130.

In one embodiment, the device 100 may be implemented with radio logic (not shown) instead of the FM radio 130. The radio logic is a component that receives radio frequency (RF) signals across a wider band than FM radio. Both FM radio 130 and the radio logic receive radio frequency signals based on a frequency specified by an input. The input is, for example, a user input or an automated input. Accordingly, device 100 may be implemented with a radio operating at a range of frequencies and, thus, clock logic 120 facilitates reducing interference from a computing/system bus in device 100 across an operational band of frequencies for the radio logic.

Figure 2:
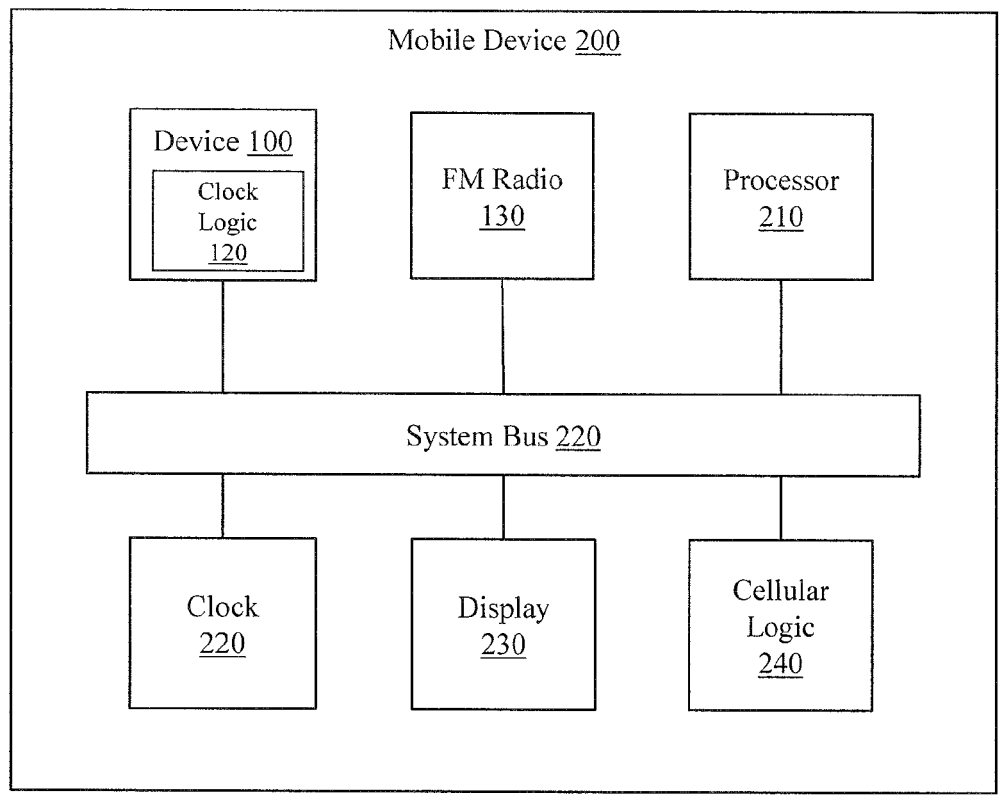
FIG. 2 illustrates one embodiment of a mobile device that includes a device configured to implement clock rate adaptation.

FIG. 2 illustrates another embodiment of the device 100 embedded in a mobile device 200. In this embodiment, device 100 is a system on a chip (SoC) and the FM radio 130 is separate from the device 100. The SoC includes a processor and other system components. In other embodiments, the device 100 is a computing device that is connected to an internal system bus 220. The mobile device 200 may include components such as a processor 210, clock 220, display 230, and cellular logic 240. The device 100 is configured to control the clock 220 by adjusting the clock rate as discussed previously based on one or more other communication frequencies used by the mobile device 200. In other embodiments, mobile device 200 is a personal navigation device, a PDA, a laptop, a smart phone, other computing device, and so on.

Figure 3:
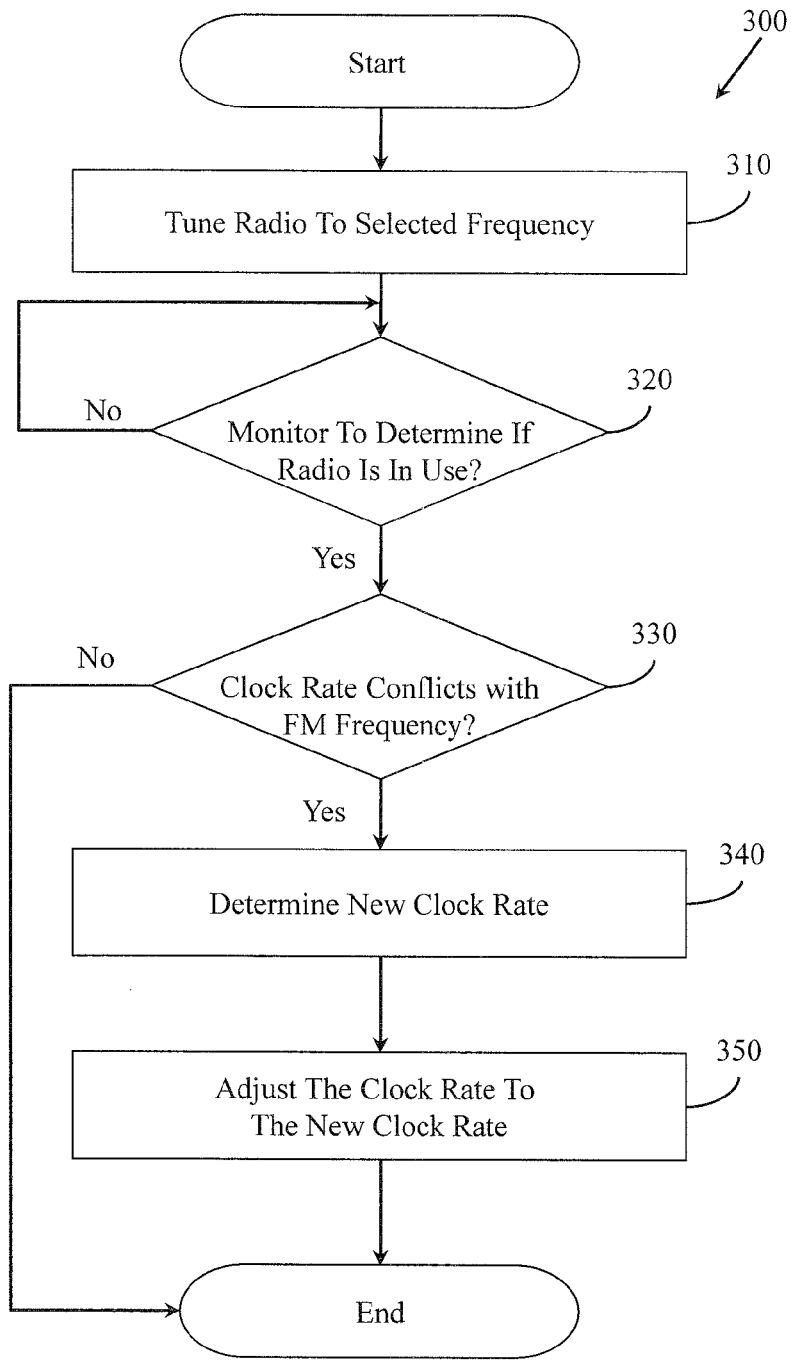
FIG. 3 illustrates one embodiment of a method associated with clock rate adaptation.

FIG. 3 illustrates a method 300 associated with reducing or eliminating interference with a radio from a system bus in a device. In one embodiment, method 300 operates in a device such as the device 100 of FIG. 1 or the mobile device 200 of FIG. 2 to reduce interference with a radio.

At 310, the radio in the device is tuned to a selected frequency. The selected frequency is, for example, received from a user input, from an application, or other interface, and the device responds by tuning the radio to the selected frequency. The radio may or may not be operating at different times (e.g., on or off, transmitting and/or receiving signals). In other embodiments, the tuning action is not part of the method but is implied to have been performed.

At 320, method 300 monitors the radio or settings in the device to determine when the radio is in use. In one embodiment, method 300 detects when an antenna in the device is receiving a signal in a predetermined range to determine when the radio is in use. The determination can be performed in other ways as previously discussed. The predetermined range is for example, an FM radio range, an amplitude modulation (AM) radio range, a wireless communication radio range, and so on. Thus, if the radio is operating, method 300 proceeds to block 330. If the radio is not operating, the method continues to monitor for the presence of a radio signal or a change in operating status.

At 330 after the method determines that the radio is in use, the method 300 determines whether a clock rate of the system bus in the device conflicts with the frequency of the radio. The clock rate conflicts with the radio frequency when the clock rate causes the system bus to produce EMI that affects the radio. In one embodiment, this occurs if the radio frequency differs from the clock rate by a value that is less than a predetermined threshold. Suppose the predetermined threshold is ±1 MHz. If the radio frequency is 99.7 MHz and the clock rate is 100 MHz, the condition is satisfied and the clock rate is changed to avoid interference since the difference between the radio frequency and the clock rate is less than the predetermined threshold. Of course, other threshold values may be used.

If no conflict is determined at 330, then method 300 ends or continues to monitor for a change in the radio frequency at 320. In one embodiment, while the radio is in use, method 300 may continuously monitor for a conflict that may be created when the radio frequency is changed. Thus, in this case, method 300 dynamically adjusts the clock rate when a conflict occurs and continuously checks for a conflict while the radio is on.

If a conflict is detected at 330, then at 340, a new clock rate that does not conflict with the currently radio frequency is determined. In one embodiment, the new clock rate is determined by adjusting the current clock rate by a rate change value so that the new clock rate and the current radio frequency are separated by a desired range to avoid causing interference with the radio. In one example, the rate change value may be 4 MHz. Other values can be used. The rate change value may be stored in memory and programmatically changed via an interface or other input method.

At 350, the clock rate is adjusted based on the rate change value. Thus, if the current radio frequency is 100 MHz and the clock rate is 100 MHz, the clock rate is adjusted by ±4 MHz. Therefore, the new clock rate is, 96 MHz or 104 MHz. Increasing or decreasing the clock rate may be dependent on conditions specified by the device in which the system bus and the radio reside. With the new clock rate in use by the system bus, interference with the radio is reduced or eliminated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A device, comprising:
   a host interface configured to exchange data between the device and a host at a clock rate; and
   a clock logic configured to change the clock rate of the host interface to reduce interference with an FM radio when the FM radio is in use, wherein the clock logic is configured to reduce the clock rate to a modified clock rate by at least a predetermined amount from a frequency in use by the FM radio, wherein the modified clock rate is not a frequency that will produce a harmonic that is within a predetermined range of the frequency in use by the FM radio.

2. A device, comprising:
a host interface configured to exchange data between the device and a host at a clock rate; and
a clock logic configured to change the clock rate of the host interface to reduce interference with an FM radio when the FM radio is in use, wherein the clock logic is configured to change the clock rate to a modified clock rate that is a frequency that will not produce a harmonic that is within a predetermined range of a frequency in use by the FM radio, and wherein the clock logic is further configured to determine when the FM radio is in use by detecting when the device is receiving radio frequency signals.

3. The device of claim 2, wherein the clock logic is further configured to determine the frequency being used by the FM radio and to change the clock rate based, at least in part, on the frequency.

4. The device of claim 2, wherein the clock logic is configured to change the clock rate when the frequency being used by the FM radio is within a predetermined range of the clock rate.

5. The device of claim 2, further comprising
a Wireless Local Area Network (WLAN) interface,
wherein the host interface includes one or more of a Secure Digital Input Output (SDIO) interface and a Serial Peripheral Interface (SPI) bus, and
wherein the host interface is further configured to receive data from the WLAN interface and transmit data to the host.

6. The device of claim 2, wherein the device is a computing device that further includes at least a processor connected to the host interface.

7. A device, comprising:
a system bus configured to transmit and receive data at a clock rate;
a radio logic configured to receive radio frequency signals; and
a clock logic configured to adjust the clock rate of the system bus when the radio logic is receiving the radio frequency signals to a modified clock rate that is a frequency that will not produce a harmonic that is within a predetermined range of a frequency in use by the radio logic.

8. The device of claim 7, wherein the system bus is a host interface configured to transmit and receive data between the device and a host, and wherein the clock rate is a pre-determined clock rate.

9. The device of claim 7, wherein the clock logic is further configured to detect when the radio logic receives the radio frequency signals.

10. The device of claim 7, wherein the clock logic is further configured to determine when the radio logic is operating.

11. The device of claim 7, wherein the radio frequency signals are based, at least in part, on a frequency specified by an input to the radio logic.

12. The device of claim 7, wherein the clock logic is further configured to adjust the clock rate on determining that the clock rate interferes with the received radio frequency signals.

13. The device of claim 7, wherein the device is a system-on-a-chip (SoC) and is implemented in a computing device that further includes at least a processor connected to the system bus.

14. A method, comprising:
detecting a frequency modulation (FM) radio is operating at a selected frequency;
adjusting a clock rate of a bus to a different clock rate in response to determining that the clock rate conflicts with the selected frequency of the FM radio, wherein the different clock rate is selected to have a frequency that will not produce a harmonic that is within a predetermined range of the selected frequency in use by the FM radio.

15. The method of claim 14, wherein the adjusting includes adjusting the clock rate for a host interface bus in a device that includes the FM radio.

16. The method of claim 14, further comprising:
monitoring the FM radio, in a device, to determine when the FM radio is in use, and adjusting the clock rate when the FM radio is in use.

17. The method of claim 16, wherein monitoring the FM radio to determine when the FM radio is in use includes detecting when an antenna in the device is receiving a signal in a predetermined range.

18. The method of claim 14, wherein adjusting the clock rate includes determining a new clock rate that does not conflict with the selected frequency and changing the clock rate to the new clock rate.

19. The method of claim 14, wherein determining that the clock rate conflicts includes determining if the selected frequency is within a predetermined range, wherein the selected frequency of the FM radio is within a range of 76 MHz to 108 MHz.

* * * * *